United States Patent
Kohn

(10) Patent No.: US 10,164,421 B1
(45) Date of Patent: Dec. 25, 2018

(54) SAFETY CIRCUITS FOR ELECTRICAL PRODUCTS

(71) Applicant: Gabriel S. Kohn, Boca Raton, FL (US)

(72) Inventor: Gabriel S. Kohn, Boca Raton, FL (US)

( * ) Notice: Subject to any disclaimer, the term of this patent is extended or adjusted under 35 U.S.C. 154(b) by 266 days.

(21) Appl. No.: 15/388,139

(22) Filed: Dec. 22, 2016

Related U.S. Application Data

(60) Provisional application No. 62/277,999, filed on Jan. 13, 2016.

(51) Int. Cl.
*H01H 73/00* (2006.01)
*H02H 3/02* (2006.01)
*H05B 1/02* (2006.01)

(52) U.S. Cl.
CPC ............... *H02H 3/02* (2013.01); *H05B 1/02* (2013.01)

(58) Field of Classification Search
USPC ........................................................ 361/115
See application file for complete search history.

(56) References Cited

U.S. PATENT DOCUMENTS

| | | | | |
|---|---|---|---|---|
| 4,554,507 A * | 11/1985 | Brown | ............... | G01R 31/263 324/750.3 |
| 5,196,781 A * | 3/1993 | Jamieson | ............... | H02J 7/35 136/291 |
| 5,223,821 A * | 6/1993 | Poe | ............... | G01R 31/263 324/764.01 |
| 5,422,461 A * | 6/1995 | Weiss | ............... | G05D 23/2401 219/212 |
| 5,770,836 A * | 6/1998 | Weiss | ............... | H05B 1/0272 219/212 |
| 9,148,911 B2 | 9/2015 | Kohn et al. | | |
| 2005/0248897 A1* | 11/2005 | Sadjadi | ............... | G08B 5/36 361/115 |
| 2006/0209483 A1* | 9/2006 | Hurwicz | ............... | G01R 31/3272 361/115 |
| 2011/0259872 A1* | 10/2011 | Wang | ............... | H05B 1/0252 219/492 |
| 2012/0099235 A1* | 4/2012 | Jezierski | ............... | H02H 5/04 361/93.8 |
| 2012/0132639 A1* | 5/2012 | Hashimoto | ............... | A23G 1/18 219/386 |
| 2013/0015174 A1* | 1/2013 | Kohn | ............... | H05B 1/0272 219/209 |
| 2015/0222108 A1* | 8/2015 | Valette | ............... | H02J 1/08 307/115 |

\* cited by examiner

*Primary Examiner* — Ronald W Leja
(74) *Attorney, Agent, or Firm* — Lawerence J. Shurupoff

(57) ABSTRACT

The response of a switch supplying electrical power to a load is periodically tested to ensure proper operation and control over the switch. In the event the switch does not respond to commands from a controller during a test cycle to turn off and open a circuit supplying power to the load, a short circuit is created by a test switch. In this event, a fuse is automatically blown preventing uncontrolled power from reaching the load. In one example, the load can take the form of a resistive heating element in an electric heating blanket or electric heating pad.

15 Claims, 3 Drawing Sheets

SAFETY CIRCUITS FOR ELECTRICAL PRODUCTS

BACKGROUND

Safety circuits for electrical products have been used for decades to protect against overheating and electrical fires caused by short circuits resulting from design defects, manufacturing and material defects and component failures. One example of a safety circuit is disclosed in U.S. Pat. No. 9,148,911 which is incorporated herein by reference in its entirety.

While prior safety circuits have been found to function adequately, they have tended to be somewhat complex in design. That is, prior safety circuits have included complex coordinated switching logic, timing circuits and testing circuits requiring numerous circuit components. These circuits and their associated operating and control software can be relatively costly to produce.

SUMMARY

In order to reduce the complexity and cost of existing safety circuits, a simplified, low cost safety circuit has been designed requiring relatively few low cost circuit components. The logic required to operate the safety circuit is relatively simple compared to that of prior safety circuits.

Because of the simple design of the safety circuit, it tends to be more reliable than more complex safety circuit designs. The safety circuit disclosed below requires a first switch arranged in a parallel circuit with a load such as a heating element. A second switch which regulates the amount of power provided to the load is deactivated, e.g. opened, once the first switch in the safety circuit is activated, e.g. closed. That is all that is required to determine if the second switch is operating properly. If the second switch is not operating as commanded to open, a fuse is automatically blown, thereby preventing power from flowing through the safety circuit and from reaching the load.

A microprocessor controls the amount of power delivered to the load by commanding the second switch to open and close based on control logic and inputs from one or more sensors and user selected power levels. If the microprocessor commands the second switch to cut power to the load by opening and creating an open circuit, but the second switch fails to open, power supplied to the load would continue uninterrupted if not for the protection provided by the safety circuit described below. This safety circuit is particularly useful in preventing a load, such as a heating element, from overheating.

DETAILED DESCRIPTION OF REPRESENTATIVE EMBODIMENTS

Figure 1:
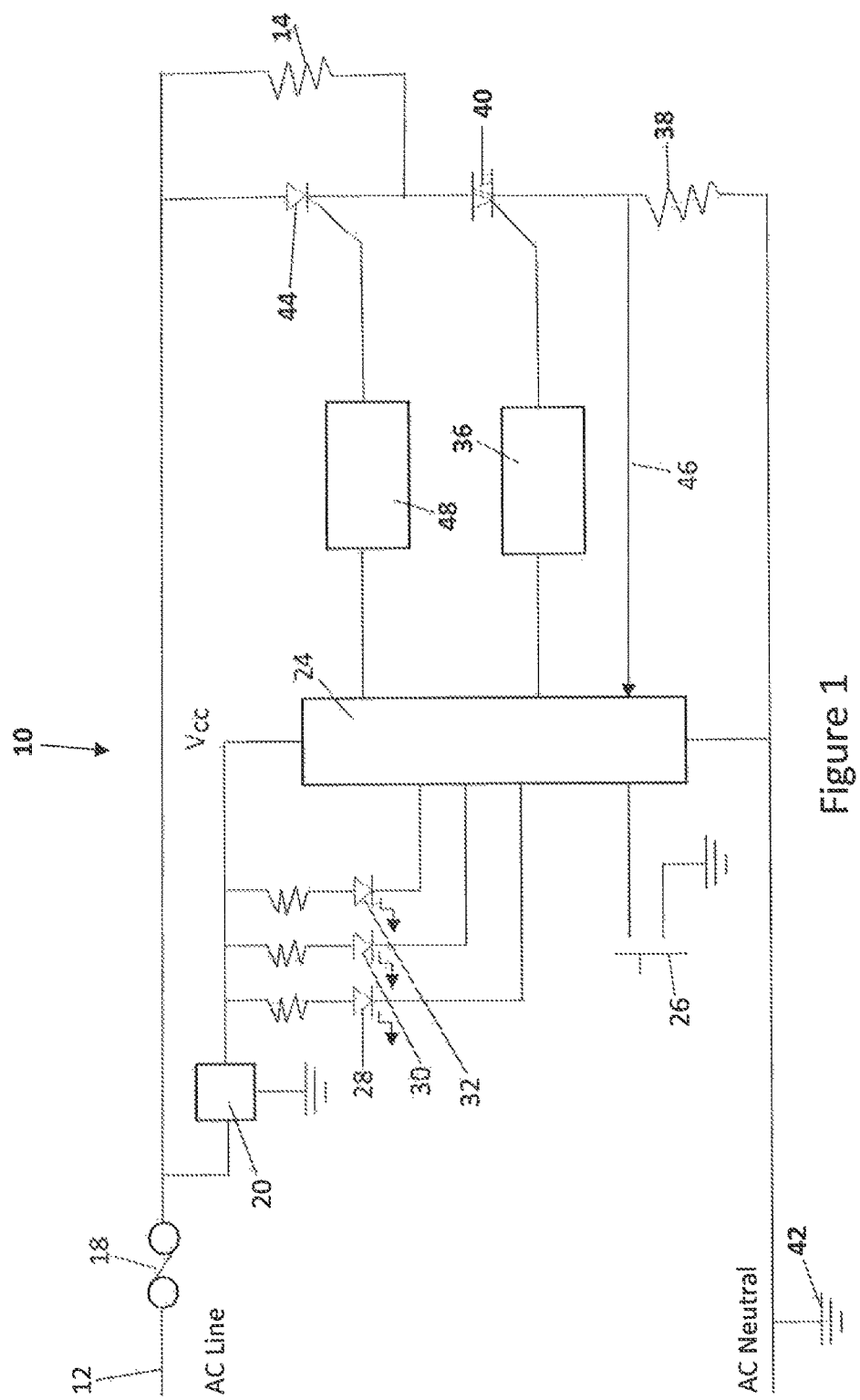
FIG. 1 is a schematic circuit diagram of a safety circuit arranged in accordance with a representative embodiment of this disclosure.

An example of a highly reliable, low cost safety circuit for electrical products is shown in FIG. 1. This simple circuit can be used with virtually any electrical appliance, but is particularly well suited for use with electrical household appliances that include a heating element or require temperature control.

For example, electric heating blankets and electric heating pads can benefit from the safety circuit shown in FIG. 1. That is, in the event of the failure of a power control switch which meters the amount of power applied to a heating element, the safety circuit will cut power to the heating element to prevent overheating of the heating element and protect a user from burns. In particular, upon detecting a loss of control over the power control switch where the power control switch will not respond to a command to cut power to the heating element, the safety circuit will automatically cause a fuse to blow thereby cutting power to the heating element to avoid overheating.

As seen in FIG. 1, a safety circuit 10 receives electric power from a power source such as through an AC household power line 12. A load, such as a resistive load created by a resistive heating element 14 is powered by the AC line 12. A fuse 18 is located between the line 12 and the rest of the safety circuit 10 and heating element or load 14 so that if the fuse 18 is blown, power to the safety circuit and to the heating element 14 is turned off.

A low voltage power supply 20 of known construction provides DC voltage to a microprocessor 24. The microprocessor 24 controls the operation of the safety circuit 10 as well as the amount of power applied to the heating element 14. A user-operated switch 26 selectively provides signals to the microprocessor 24 to select a desired level of heat produced by the heating element 14 as well as to select a standby mode placing the safety circuit 10 in standby.

In this example, three levels of heat can be selected by actuating the switch 26 repetitively through a preset cycle. The level of heat selected is indicated in a known fashion by corresponding indicator lights such as LEDs 28, 30, and 32 representing low, medium, and high levels of heat output from the heating element 14.

Once a user selects a level of heat, the microprocessor 24 activates a temperature control circuit of conventional design, such as the triac activation circuit 36. The triac activation circuit 36 is turned on and off by the microprocessor 24 to open and close a triac 40 according to a timed cycle. The timed cycle can correspond to the heat level selected by a user and executed by commands from the microprocessor 24.

The triac 40 can also be controlled by temperature signals received by the microprocessor 24 from temperature sensors provided on the heating element 14. In one example, the heating element 14 can serve as a source of temperature signals. For example, a resistor 38 can be placed in the safety circuit 10 between the bottom of the triac 40 and ground 42 to provide a temperature signal 46 to the microprocessor 24.

Because the resistance of the heating element 14 varies as a function of its temperature, the corresponding varying current through the heating element 14 can be used to produce the temperature signal 46. The temperature signal 46 is sent to the microprocessor 24 in the form of a voltage signal across resistor 38 that is produced by current flowing through the load 14.

The triac 40 serves as a power switch arranged in series with the fuse 12 and the heating element 14 to regulate power to the heating element 14. In the unlikely event that the triac 40 becomes unresponsive to operating commands from the triac activation circuit 36, the safety circuit 10 will cut off power to the heating element 14. That is, if the triac 40 remains closed when the triac activation circuit 36 commands the triac to open, the heating element could overheat due to the constant unregulated flow of current through the heating element 14.

Failure of the triac to open when commanded by the microprocessor 24 and triac activation circuit 36 allows electrical current to continue to flow uninterrupted through the heating element 14. This could be caused by a defective triac 40 which remains closed allowing uncontrolled current flow through the heating element 14.

Since the amount of heat produced by the heating element 14 is controlled through the switching of the triac 40, it is important from a safety standpoint to provide a way to cut power to the heating element other than through the microprocessor 24 and the triac activation circuit 36. If the triac 40 becomes shorted, there is no way for the microprocessor 24 or the triac activation circuit 36 to turn off power to the heating element 14. This can result in excessive heat produced by the heating element 14. To prevent this condition, the safety circuit 10 will deactivate itself and protect a user from electrical shock and burns.

Under normal operating conditions, the triac 40 is turned on and off as commanded by the microprocessor 24 through the triac activation circuit 36 to provide a level of power to the heating element 14 as selected by a user. A test switch 44 is arranged in a parallel circuit with the heating element 14. Any type of electronic switch or relay can be used for the test switch 44 as long as it can be actuated by signals from the microprocessor 24. For example, switch 44 can be a silicon controlled rectifier (SCR).

The test switch 44, when in the form or, for example, an SCR, is actuated on and off by commands from the microprocessor through a SCR activation circuit 48 of known construction.

When the heating element 14 is receiving power, the test switch 44 is commanded by the microprocessor 24 to remains open. Current then flows through the heating element 14 when the triac 40 is closed. Again, the triac 40 is opened and closed for periods of time depending on the level of heat selected by a user. In addition, in response to the temperature signal 46, the triac 40 is opened by the microprocessor 24 and triac activation circuit 36 if the heating element 40 or a product heated by the heating element becomes overheated and requires a cooling off period as is well known in the appliance industry.

Once the temperature of the heating element 14 and/or the temperature of the product being heated by the heating element 14 returns to an acceptable operating level, power is re-applied to the heating element 14 by the microprocessor 24 by closing the triac 40 via the triac activation circuit 36 according the a programmed on-off cycle provided by the microprocessor and as selected by a user.

The safety circuit 10 via test commands from the microprocessor 24 periodically checks whether the triac 40 is responding to commands from the microprocessor 24 to turn off the power to the heating element 14 before the heating element and/or the product being heated reach unacceptable operating temperatures. The test is simple. The microprocessor 24 periodically, via the triac activation circuit, turns the triac 40 off and then turns the test switch 44 on. Power will now bypass the heating element 14 and flow freely through the test switch 44 provided the triac 40 is closed.

When the test switch 44 is closed and the triac 40 is commanded to open, one of two outcomes will result. First, if the triac 40 responds properly to the command to turn off and thereby creates an open circuit, no current will flow through the fuse 18 or through the heating element 14. In effect, nothing happens. This provides an assurance that the microprocessor 24 can command the triac 40 to open to prevent the load from receiving excess uncontrolled power.

However, if the triac 40 is not functioning properly, is shorted and/or and not responding to commands to turn off and open the circuit, a second outcome results. That is, if the triac 40 remains closed when the test switch is closed, a short circuit is created across the AC line 12. This causes the fuse 18 to blow, open the circuit 10 and render the circuit 10 inoperative. Power will no longer flow through the heating element 14 thereby preventing undesirable overheating.

Figure 2:
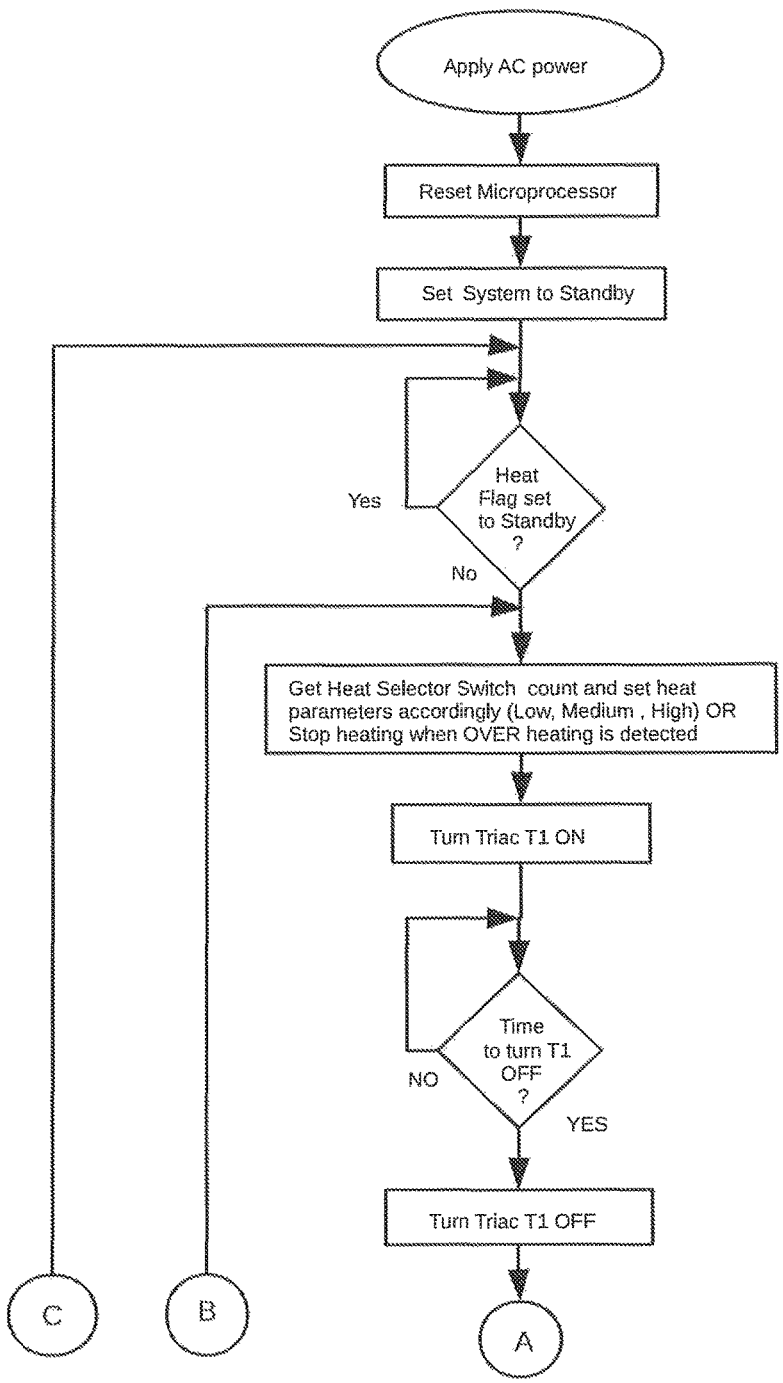
FIGS. 2 and 3 are representative flow charts depicting an example of the operating logic applied to the circuit of FIG. 1.
Figure 3:
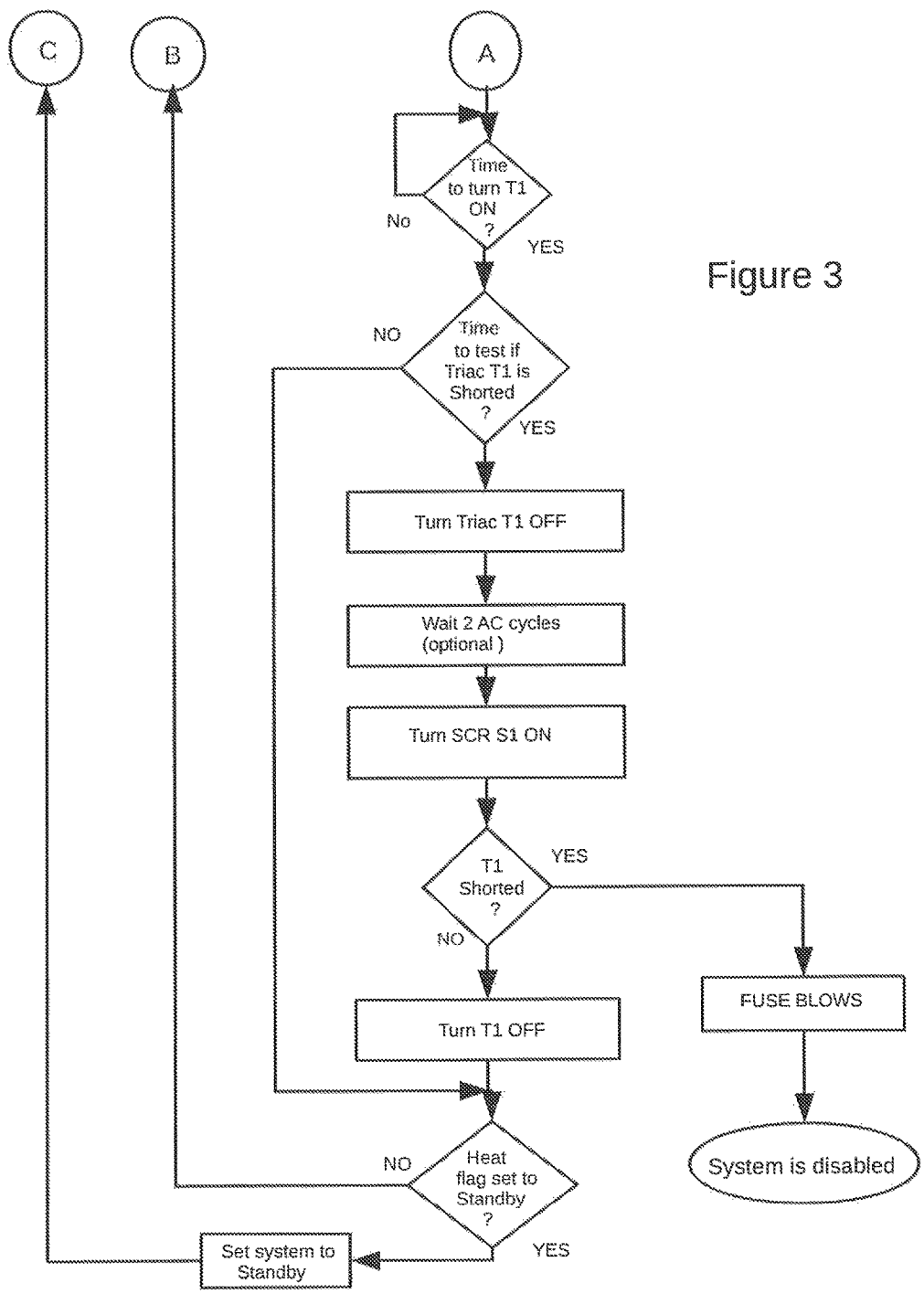

FIGS. 2 and 3 depict an example of a flow chart for the operation of the safety circuit 10 described above. The flow chart is self-explanatory and readily understood by one skilled in the art.

There has been disclosed the best embodiment of the safety circuit as presently contemplated. Numerous modifications and variations of the safety circuit are possible in light of the above teachings. It is therefore understood that within the scope of the appended claims, the safety circuit concepts may be practiced otherwise than as specifically described herein. For example, the test switch 44 need not be an SCR. It could be a triac or a relay. Additionally, as described above, the triac 40 is turned on and off during its normal operation as a component of the temperature control of the heating element 14. The activation of the test switch 44 can be timed to close during the periods when the triac 40 is turned off during its normal operating cycle to verify that the triac 40 is actually turned off. This would replace the independent testing cycle described above.

What is claimed is:

1. A safety circuit, comprising:
a microprocessor;
a test switch controlled by said microprocessor;
a power switch arranged in series with said test switch and controlled by said microprocessor;
a load arranged in parallel with said test switch;
a fuse arranged in series with said test switch and said power switch;
said test switch opening to provide power to operate said load;
said test switch closing to bypass power around said load during a test of said power switch;
said microprocessor commanding said power switch to open and said test switch to close to test operation of said power switch; and
said fuse blowing and preventing power from reaching said load if said test switch and said power switch remain closed at the same time during said test.

2. The safety circuit of claim 1, wherein said test switch comprises a silicon controlled rectifier.

3. The safety circuit of claim 1, wherein said power switch comprises a triac.

4. The safety circuit of claim 1 further comprising a first activation circuit controlled by said microprocessor and operating said test switch.

5. The safety circuit of claim 1, further comprising a second activation circuit controlled by said microprocessor and operating said power switch.

6. The safety circuit of claim 1, wherein said load comprises a heating element.

7. The safety circuit of claim 1, wherein said first switch comprises a relay.

8. The safety circuit of claim 1, further comprising a user-actuated switch enabling selection of one or more power levels powering said load.

9. The safety circuit of claim 1, wherein said power switch is turned on and off from commands from said microprocessor to control and maintain a temperature of said load as selected by a user.

10. The safety circuit of claim 9, wherein said test switch is closed by commands from said microprocessor after said power switch is commanded to turn off.

11. The safety circuit of claim 1, wherein said load comprises an electric heating blanket or an electric heating pad.

12. A method for safely providing electrical power to a load arranged within a safety circuit, comprising:
   providing a microprocessor;
   providing a test switch in parallel with said load;
   providing a power switch in series with said test switch and with said load;
   providing a fuse in series with said load, with said test switch and with said power switch;
   opening said test switch and closing said power switch to provide power to said load;
   testing operation of said power switch by commanding said power switch to open with commands from said microprocessor to create an open circuit to prevent power from reaching said load;
   closing said test switch to bypass power around said load during said testing to test operation of said power switch; and
   blowing said fuse if said test switch and said power switch are closed at the same time.

13. The method of claim 12, further comprising commanding said power switch to open before closing said test switch.

14. The method of claim 12, further comprising testing the response of said power switch to said commands when said power switch has been commanded to open to regulate power delivered to said load.

15. The method of claim 12, further comprising:
   providing a temperature sensor in said safety circuit;
   sensing the temperature of said load with said temperature sensor;
   sending a signal to said microprocessor from said temperature sensor corresponding to said temperature of said load;
   commanding said power switch to open in response to said microprocessor receiving said signal from said temperature sensor; and
   closing said test switch after said commanding.

\* \* \* \* \*